(No Model.) 2 Sheets—Sheet 2.
N. C. BASSETT.
ELECTRIC MOTOR TRUCK.
No. 568,891. Patented Oct. 6, 1896.
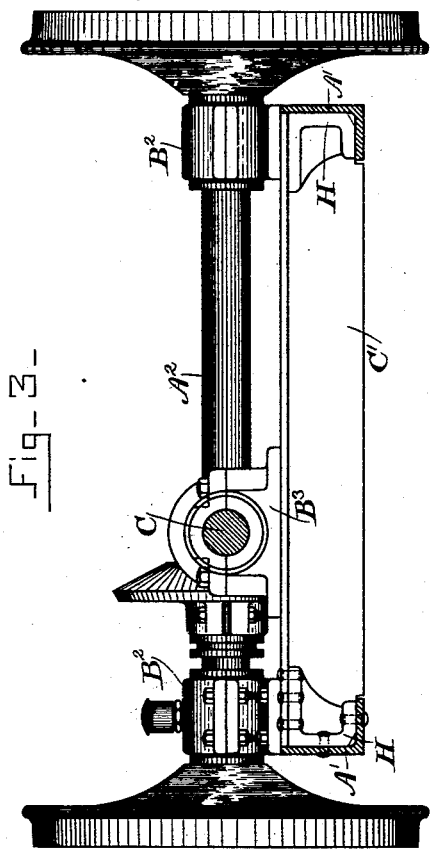
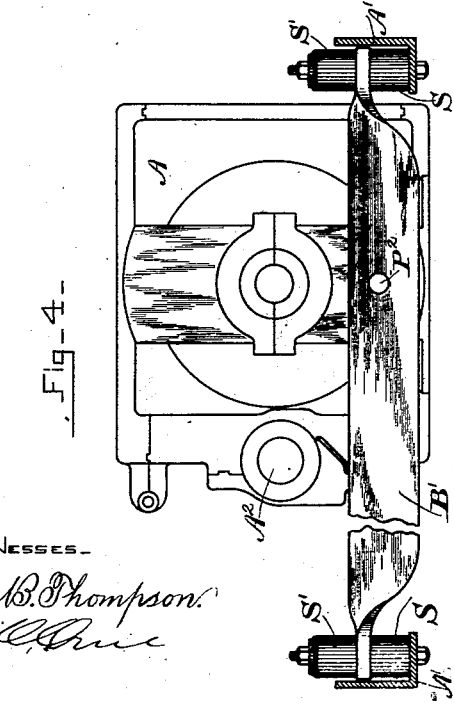
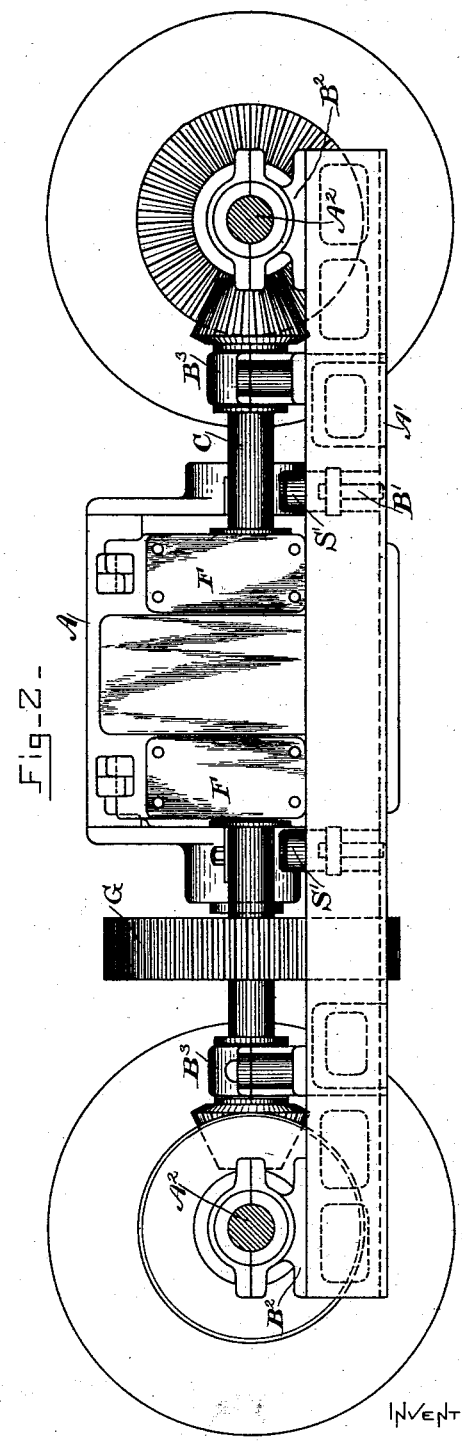
Witnesses—
S. B. Thompson
A. C. ___
Inventor—
Norman C. Bassett
by ___ Knight
Atty.

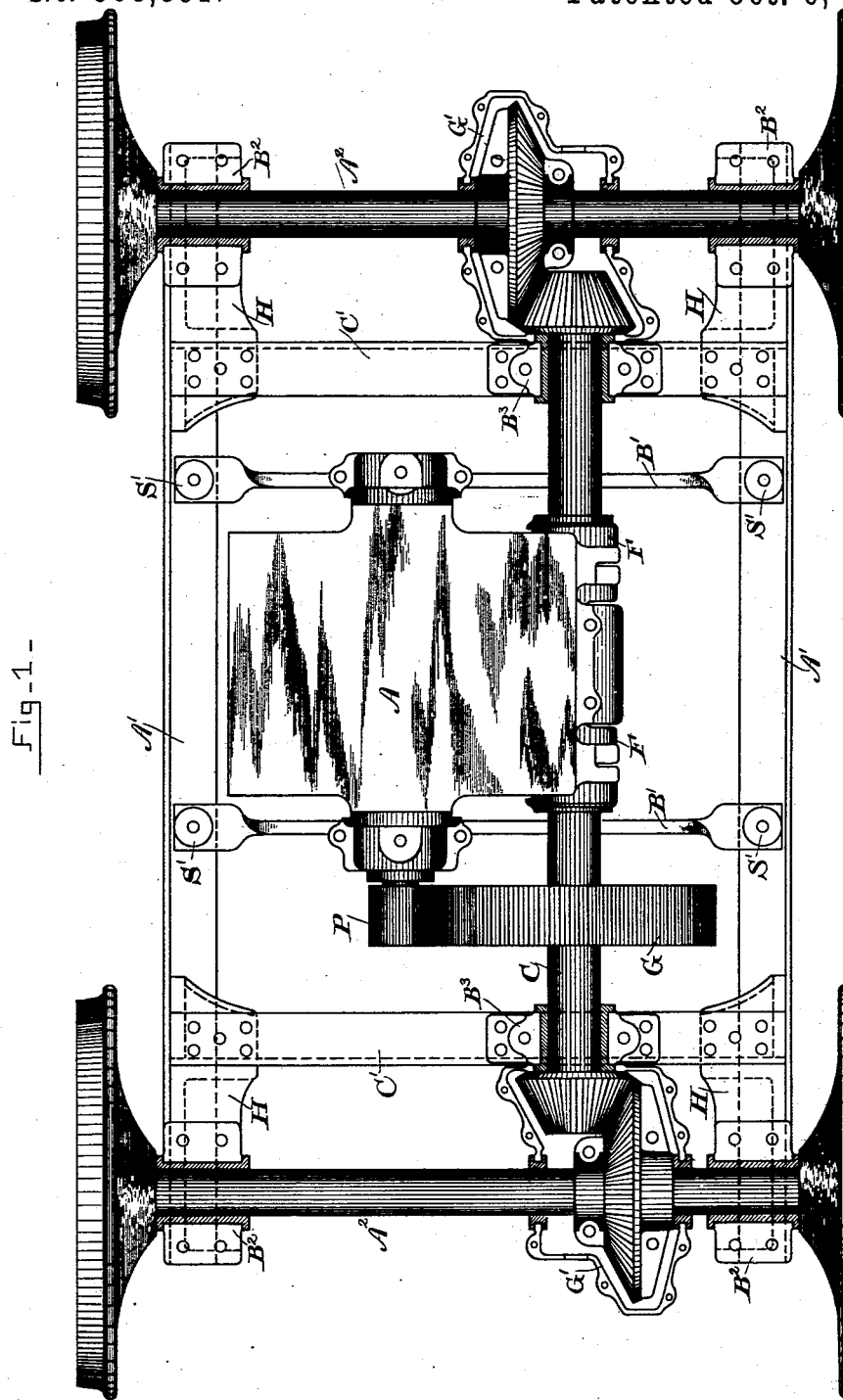

UNITED STATES PATENT OFFICE.

NORMAN C. BASSETT, OF LYNN, MASSACHUSETTS, ASSIGNOR TO THE THOMSON-HOUSTON ELECTRIC COMPANY, OF CONNECTICUT.

ELECTRIC-MOTOR TRUCK.

SPECIFICATION forming part of Letters Patent No. 568,891, dated October 6, 1896.

Application filed March 20, 1891. Serial No. 385,747. (No model.)

*To all whom it may concern:*

Be it known that I, NORMAN C. BASSETT, a citizen of the United States, residing at Lynn, in the county of Essex and State of Massachusetts, have invented a certain new and useful Improvement in Electric-Motor Trucks, of which the following is a specification.

The object of my present invention is to secure a desirable construction of motor-truck in which a single electric motor is used, preferably geared to both axles, so as to secure the maximum tractive effect. In so far, however, as certain specific features claimed may be of service in other trucks than the above I do not intend to be limited to such a one alone. To this end I join the axles by a truck-frame of somewhat peculiar construction, and a counter-shaft arranged longitudinally on this frame is geared to both axles and driven by an electric motor elastically supported from the frame, but so connected with the counter-shaft that the play of the armature is always concentric with the shaft. All these features are shown in the accompanying drawings, wherein—

Figure 1 is a plan view; Fig. 2, a sectional side view taken just inside the wheels; Fig. 3, an end sectional view, and Fig. 4 a side view of the motor and motor-carrying bars.

In the views, $A^2$ represents the axles of a car-truck, which are joined by a truck-frame composed of side-bars A', angle-shaped in cross-section, cross-bars C', rigidly attached to the side-bars, and motor-carrying bars B'. The bars C' are attached to A' by corner-pieces H, bolted or riveted, as seen in Fig. 3, to the different bars. The frame may then be placed on a planer and spots planed off true to receive the axle-boxes $B^2$ by which the frame is hung on the axles, and boxes $B^3$ on the cross-bars in which is journaled a counter-shaft C extending longitudinally of the truck and connected by bevel-gears, as shown, to both axles. These gears will be inclosed by casings G' to keep out dust and to retain oil.

The motor A is elastically supported on the truck-frame, and to this end I place cushions S S' between the bars B' and side-bars A', and the motor is pivoted to the side-bars by substantial pivots $P^2$, placed directly below the center of the armature and vertically in line with the center of gravity of the machine. Hence the entire weight of the motor will come upon these pivot-pins and be ultimately supported by the cushions from side-bars A' and axles. This elastic support allows the motor a slight play sufficient to relieve the shocks and pounding to which the truck is subjected.

To maintain the armature-pinion P in working relation with gear-wheel G upon the counter-shaft, boxes F, attached to the motor, are given a bearing on the counter-shaft. This keeps the armature and counter-shaft in alinement, maintaining an equal distance between their centers.

The form of truck-frame indicated allows the ready removal of all the boxes or brasses used for bearings and it has greater flexibility than a solid cast frame. If the track on which the wheels run is uneven, the frame will permit the axles to be warped sufficient to accommodate them to the track, but at the same time it is very rigid in a horizontal direction, resisting the throwing of the axles out of parallel fore and aft. The entire weight of the motor is supported on springs, and very little wear comes upon the counter-shaft. The play which the motor is permitted cannot interfere with the working of the gears P G, and as the counter-shaft has rigid bearings relatively to the axles there is no difficulty in maintaining the bevel-gears properly in mesh.

What I claim as new, and desire to secure by Letters Patent, is—

1. The combination in an electric-motor truck with longitudinal side-bars forming part of a truck-frame, of a longitudinal counter-shaft geared to the car-axles and mounted in bearings in fixed relation thereto, and a motor elastically supported upon the side-bars, having its axis parallel with the counter-shaft and having bearings on said counter-shaft, whereby the armature-gear is maintained in mesh with that on the shaft.

2. The combination of the longitudinal side-bars, forming part of the truck-frame, with the cross-bars affording rigid bearings for a counter-shaft geared to both axles, and the motor-carrying bars furnishing an elastic support for the propelling-motor.

3. An electric-motor truck having elastically-supported motor-carrying bars, and an electric motor pivoted thereto in substantially the line of the center of gravity of the machine and geared to the driven axle or axles, as described.

4. The combination with a truck-frame, of a longitudinally-arranged shaft geared to both axles by bevel-wheels, and an electric motor pivotally supported on transverse elastically-supported bars and geared to the shaft, substantially as described.

In testimony whereof I have hereto set my hand this 14th day of March, 1891.

NORMAN C. BASSETT.

Witnesses:
JOHN W. GIBBONEY,
BENJAMIN B. HULL.